United States Patent [19]

Mahr

[11] Patent Number: 5,058,237
[45] Date of Patent: Oct. 22, 1991

[54] SNAP-ON HINGE FOR A REMOVABLE LOAD PLATFORM IN MOTOR VEHICLES

[75] Inventor: Josef Mahr, Cologne, Fed. Rep. of Germany

[73] Assignee: Ford Motor Company, Dearborn, Mich.

[21] Appl. No.: 589,105

[22] Filed: Sep. 27, 1990

[30] Foreign Application Priority Data

Sep. 27, 1989 [DE] Fed. Rep. of Germany ....... 3932128

[51] Int. Cl.⁵ .................................................. E05D 1/00
[52] U.S. Cl. ........................................ 16/225; 16/254; 16/382; 16/DIG. 13
[58] Field of Search ................................. 16/225-227, 16/234, 254, 355, 378, 379, 382, 385, 387, DIG. 13, 261, 263, 268

[56] References Cited

U.S. PATENT DOCUMENTS

| 826,257 | 7/1906 | Kountz | 16/382 |
|---|---|---|---|
| 2,909,803 | 10/1959 | Solheim | 16/382 |
| 3,204,288 | 9/1965 | Adams | 16/268 |
| 3,653,092 | 4/1972 | Shriner | 16/268 |
| 4,670,938 | 6/1987 | Fowlston | 16/385 |

FOREIGN PATENT DOCUMENTS

| 706573 | 3/1965 | Canada | 16/350 |
|---|---|---|---|
| 864505 | 4/1941 | France | 16/268 |

Primary Examiner—Richard K. Seidel
Assistant Examiner—Edward A. Brown
Attorney, Agent, or Firm—Daniel M. Stock; Roger L. May

[57] ABSTRACT

A snap-on hinge for a removable load platform in motor vehicles, with a fixing plate which is fixed on the load platform and has a downwardly projecting resilient tongue which cooperates in the manner of a hinge with an opening in a vertical wall in the receiving frame of the vehicle body is constructed as a plastic molding with a central upper tongue with an engaging nose and a lower projection and two lateral lower tongues which cooperate with an upper opening in a horizontal wall and with a lower opening in a vertical wall and has on the lower tongues supporting cams which rest on a horizontal shoulder on the receiving frame.

5 Claims, 2 Drawing Sheets

SNAP-ON HINGE FOR A REMOVABLE LOAD PLATFORM IN MOTOR VEHICLES

BACKGROUND OF THE INVENTION

1. Field of the Invention

The invention relates generally to snap-on hinges and more specifically to a snap-on hinge for a removable load platform in motor vehicles of the type in which the Platform carries a tongue which cooperates in hinge-like fashion with the vehicle body.

2. Description of the Related Art

A snap-on hinge for a removable load platform in motor vehicles is known from DE-PS 27 41 540.

In this load platform composed of wood, a mounting part has a downwardly projecting resilient tongue which cooperates in the manner of a hinge with an opening in a vertical wall in a receiving frame of the vehicle body.

To avoid rattling noises, this load platform must be provided, at its peripheral face edges, with a surrounding carpeted floor covering with which it rests on a horizontal shoulder in the receiving frame and a spring shackle formed from sheet metal must be provided with a rubber tube.

This known snap-on hinge for a removable load platform in motor vehicles has the disadvantage that it can only be used in conjunction with a load platform of wood with correspondingly expensive carpet covering, making the production of such a load platform disproportionately expensive owing to the manual work required.

It is also known to provide vehicle load platforms formed from sheet metal in which simple strap hinges are mounted on the load platform and on the receiving frame of the vehicle body by screws.

However, this relatively simple method of mounting has the disadvantage that removal of the load platform can only be performed using tools.

An additional disadvantage arises with load platforms formed from sheet metal when the strap hinges are mounted by spot welding, since this completely prevents removal of the load platform.

Although a snap-on hinge constructed as a plastic molding is already known from EP-PS 0 013 338, this one does not cooPerate with openings in a receiving frame of a vehicle body and does not have such carrying supporting cams. Furthermore, a snap-on hinge of this type is proposed merely for a hood of a data processing terminal which is composed of plastic material anyway.

SUMMARY OF THE INVENTION

An object of the invention is to provide a snap-on hinge for removable load platform in motor vehicles, which can be formed from sheet metal, does not necessarily require a carpet covering, and can be assembled and disassembled simply by engagement and disengagement of the snap-on hinge.

According to the invention, the snap-on hinge is constructed as a plastic molding with a central upper tongue and two lateral lower tongues, which cooperate with an upper opening in a horizontal wall and with a lower opening in a vertical wall of the receiving frame of the vehicle body. Additionally, supporting cams which rest on a horizontal shoulder in the receiving frame of the vehicle body are provided. The load platform is supported at its free end on suitable rests on the receiving frame of the vehicle body and is clamped by toggles. Because of this construction, a snap-on hinge which is simple to manufacture is provided. The invention hinge simplifies assembly and disassembly of a load platform in a motor vehicle and ensures rattle-free support of the load platform in the closed position thereof.

BRIEF DESCRIPTION OF THE DRAWINGS

The invention is described in more detail with reference to an embodiment which is illustrated in the accompanying drawings in which.

DESCRIPTION OF THE PREFERRED EMBODIMENT

Figure 1:
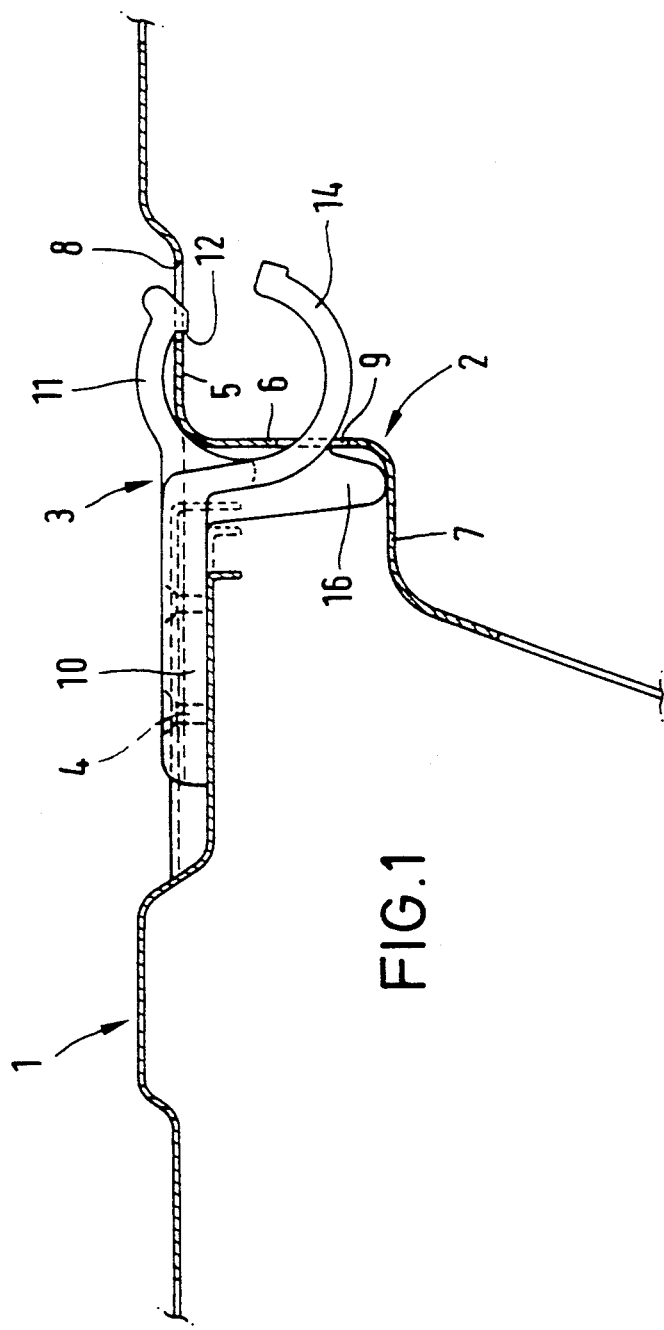
FIG. 1 shows a vertical section through a load platform composed of sheet metal articulated and supported in a receiving frame of a vehicle body by the snap-on hinge according to the invention.
Figure 3:
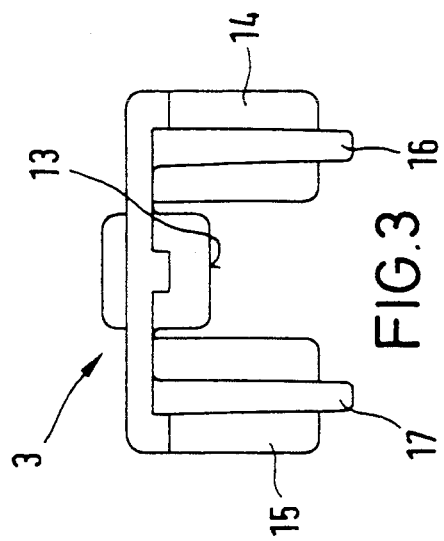
FIG. 3 shows a view of the snap-on hinge in the direction of the arrows III—III in FIG. 2.
Figure 2:
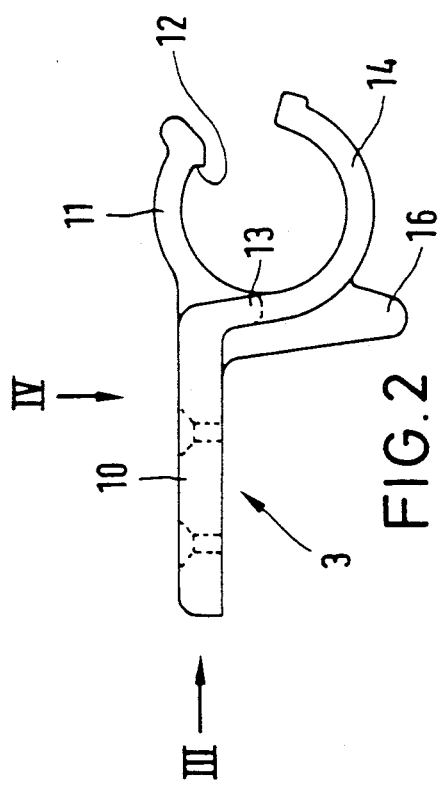
FIG. 2 shows a side view of the snap-on hinge according to the invention.
Figure 4:
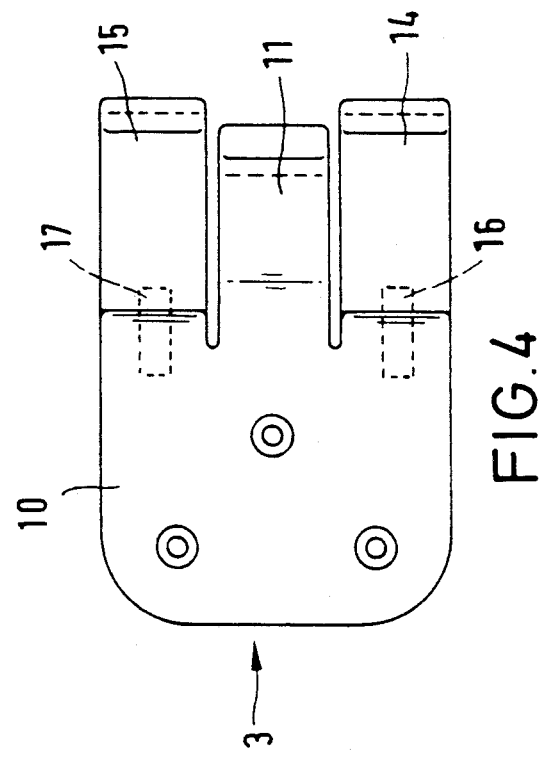
FIG. 4 shows a view of the snap-on hinge in the direction of the arrows IV—IV in FIG. 2.

A load platform 1 constructed as a sheet metal stamping is arranged in a receiving frame 2 of a vehicle body formed in a known manner by parts of the underbody of the motor vehicle. A snap-on hinge 3 is constructed as a plastic molding and is mounted simply on the load platform 1 by screws 4. The receiving frame 2 of the vehicle body has an upper depression 5, a vertical wall 6 and a lower horizontal shoulder 7. An upper opening 8 is punched in the upper depression 5 and a lower opening 9 in the vertical wall 6.

The snap-on hinge 3 consists of a mounting plate 10, a central upper tongue 11 with an internal engaging nose 12 and a lower projection 13 and two lateral lower tongues 14 and 15 with supporting cams 16 and 17 molded thereon.

The central upper tongue 11 and the lateral lower tongues 14 and 15 are situated on the periphery of a cylinder which defines the pivoting axis of the load platform 1 controlling its movement to and from the load platform shown in FIG. 1. The rounded region between the upper depression 5 and the vertical wall 6 in the receiving frame 2 of the vehicle body forms the opposing bearing for the hinge cylinder formed by the tongues.

The supporting cams 16 and 17 on the lower tongues 14 and 15 of the snap-on hinge 3 are formed having a height such that the lower tongues 14 and 15 are clamped in their opening 9 in the vertical wall 6 by the engagement of the cams 16, 17 against the horizontal shoulder 7 so that a secure support for the load platform 1 is achieved and while rattling noises are avoided due to the clamping.

The engaging nose 12 on the upper tongue 11 prevents excessive horizontal travel of the snap-on hinge 3 toward the rear, but allows simple disengagement of the snap-on hinge 3 from the openings 8 and 9 in the receiving frame of the vehicle body by a fairly strong pull when the load platform is raised upward by about 20 to 30 degrees. In the reverse direction, the load platform can be installed by simple engagement in the openings in the receiving frame of the vehicle body.

The load platform is preferably supported at its free end on suitable rests on the receiving frame of the vehicle body and is clamped by toggles.

I claim:

1. A hinge assembly for pivotally mounting a load platform on the body of a vehicle for movement to and from a load position, the assembly comprising:

a vehicle body frame receiving unitary molded hinge member for pivotal movement with respect thereto, the frame including a vertical wall, an upper horizontal wall, and a lower horizontal shoulder;

means defining at least one opening in each of said vertical wall and said upper horizontal wall; and said unitary molded hinge member fixedly secured to said load platform and including upper tongue means and lower tongue means engageable in snap-fit relationship with said vehicle body frame through the upper horizontal wall opening and the vertical wall opening, respectively.

2. A hinge assembly as defined in claim 1, wherein said upper tongue means comprises a central tongue received in said upper horizontal wall opening and said lower tongue means comprises a pair of spaced lower tongues receivable in said at least one vertical wall opening.

3. A hinge assembly as defined in claim 2, wherein said upper tongue includes an internal engaging nose portion for effecting said snap-fit engagement.

4. A hinge assembly as defined in claim 2, wherein said upPer and lower tongues define a pivot axis for said load platform.

5. A hinge assembly as defined in claim 2 and further comprising:

a pair of support cams formed adjacent said spaced lower tongues and engageable against said lower horizontal shoulder when said load platform is in its load position to clampingly engage said hinge member into engagement with said vehicle body frame.

* * * * *